US012683345B1

(12) United States Patent
Lee

(10) Patent No.: US 12,683,345 B1
(45) Date of Patent: Jul. 14, 2026

(54) CHIP CONNECTOR DEVICE AND SYSTEM

(71) Applicant: John Sebastian Lee, Dallas, TX (US)

(72) Inventor: John Sebastian Lee, Dallas, TX (US)

( * ) Notice: Subject to any disclaimer, the term of this patent is extended or adjusted under 35 U.S.C. 154(b) by 0 days.

(21) Appl. No.: 19/285,449

(22) Filed: Jul. 30, 2025

(51) Int. Cl.
*H01R 33/97* (2006.01)
*H01R 13/73* (2006.01)

(52) U.S. Cl.
CPC ............. *H01R 33/97* (2013.01); *H01R 13/73* (2013.01)

(58) Field of Classification Search
CPC ................................ H01R 33/97; H01R 13/73
USPC .......................................................... 439/574
See application file for complete search history.

(56) References Cited

U.S. PATENT DOCUMENTS 5,073,119 A * 12/1991 Soes .................... H01R 12/585 439/82
5,144,412 A * 9/1992 Chang ................. H10P 72/0442 361/783
5,777,852 A * 7/1998 Bell ...................... H05K 7/1069 361/767
5,779,057 A * 7/1998 LePage ................ H01R 43/205 206/511
6,624,647 B2 * 9/2003 Adams ................. G01R 1/0483 324/755.05
6,669,498 B2 * 12/2003 Okita ................. H05K 13/0447 439/264
6,877,990 B2 * 4/2005 Liao ....................... H01R 12/88 439/41
7,118,385 B1 * 10/2006 Bodenweber ........ H05K 7/1061 439/71
7,722,413 B2 * 5/2010 Tonosaki ............... H01R 13/41 439/82
7,780,483 B1 * 8/2010 Ravlich ................ H01R 12/585 439/82
7,841,868 B2 * 11/2010 Tang .................. H01R 12/7076 439/71
7,946,861 B2 * 5/2011 Sander ................. H01R 12/585 439/82
7,963,775 B2 * 6/2011 Reisinger ........... H01R 12/7082 439/82
8,371,871 B1 * 2/2013 Murphy ............... H01R 12/585 439/444
8,426,744 B2 * 4/2013 Hayashi ............. H01R 12/7029 361/740
10,044,142 B1 * 8/2018 Leon ....................... F21V 23/06
10,103,463 B1 * 10/2018 Hughes .................. H01R 13/04
11,410,844 B2 * 8/2022 Spaun ................. H01J 49/0018
11,503,732 B1 * 11/2022 Costello ............... H05K 7/1061
2005/0272279 A1 * 12/2005 McHugh .............. H05K 7/1061 439/71
2021/0084745 A1 * 3/2021 Kim ..................... H05K 1/0201

* cited by examiner

*Primary Examiner* — Harshad C Patel
(74) *Attorney, Agent, or Firm* — Plager Schack LLP; Mark H. Plager; Naomi Mann

(57) ABSTRACT

A system for connecting a computer chip to an item provides a chip connector device that includes a tray configured to retain the chip, and at least one barbed post coupled to an underside of the tray, wherein the barbed post is configured to pierce and enmesh within a soft, pliable, and/or plush material in the item.

20 Claims, 4 Drawing Sheets

CHIP CONNECTOR DEVICE AND SYSTEM

BACKGROUND

The present disclosure relates generally to systems for secure attachment of a computerized chip or other small object to various items.

SUMMARY

According to various embodiments, disclosed is a system for connecting a computer chip to an item, which may comprise attaching a chip connector device to the item. In some embodiments, the chip connector device includes a tray configured to retain the computer chip, and at least one barbed post coupled to an underside of the tray, wherein the barbed post is configured to pierce and enmesh within a soft, pliable, and/or plush material in the item. In some embodiments, attaching the chip connector device comprises forcing the barbed post through the material of the item.

In certain embodiments, the barbed post comprises a post having a sharp bottom end configured to pierce the material in the item. In some embodiments, the barbed post further includes a plurality of barbs which are coupled to the post, and which are configured to embed in the material. In some embodiments, the connector device includes a single barbed post at an approximate center of the tray. In certain embodiments, the connector device includes multiple barbed posts. In some embodiments, the connector device includes 4 barbed posts which are disposed proximate corners of the tray. In further embodiments, the plurality of barbs are each curved upwards from the post towards the tray to form upwardly extending hooks in the post. In some embodiments, the plurality of barbs each have a pointed end. In certain embodiments, the barbed post is approximately 10 mm in length. In some embodiments, the barbed post includes about 25-30 barbs, which are distributed along a length and a circumference of the post. In some embodiments, the barbed post includes about 50-60 barbs, which are distributed along a length and a circumference of the post.

In certain embodiments, the tray includes a plurality of perforations configured to receive connector pins in the chip. In some embodiments, the tray includes opposing side walls which enable the connector device to be held. In certain embodiments, the side walls in the tray flare outwards. In some embodiments, the tray has a rectangular shape and is approximately 15 mm by 25 mm, with a thickness of less than about 1 mm.

In certain embodiments, the computer chip is a GPS tracking chip. In some embodiments, the chip stores information regarding an identity of an owner of the item. In some embodiments, the chip stores information regarding the item. In some embodiments, the soft, pliable, and/or plush material comprises leather, animal skin, Kevlar, natural fabric, synthetic fabric, soft metal, soft plastic, wood, and/or padding.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
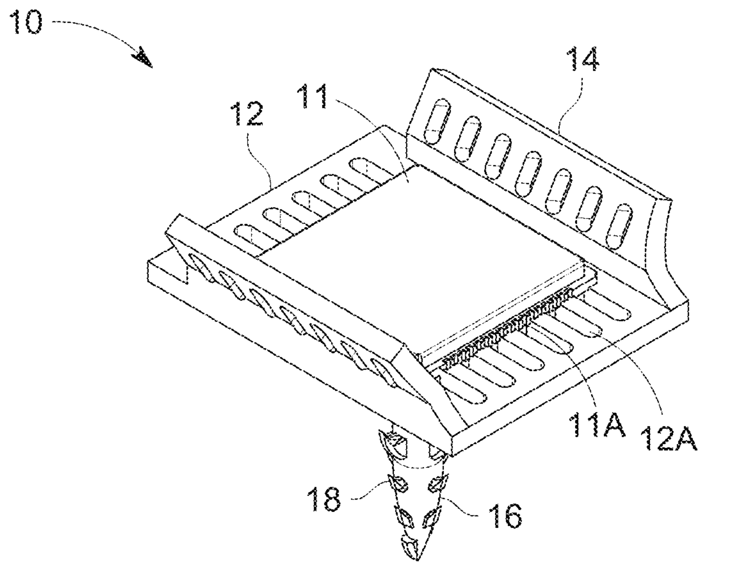
FIG. 1 is a perspective view of a chip connector, shown holding a GPS chip, according to various embodiments.
Figure 2:
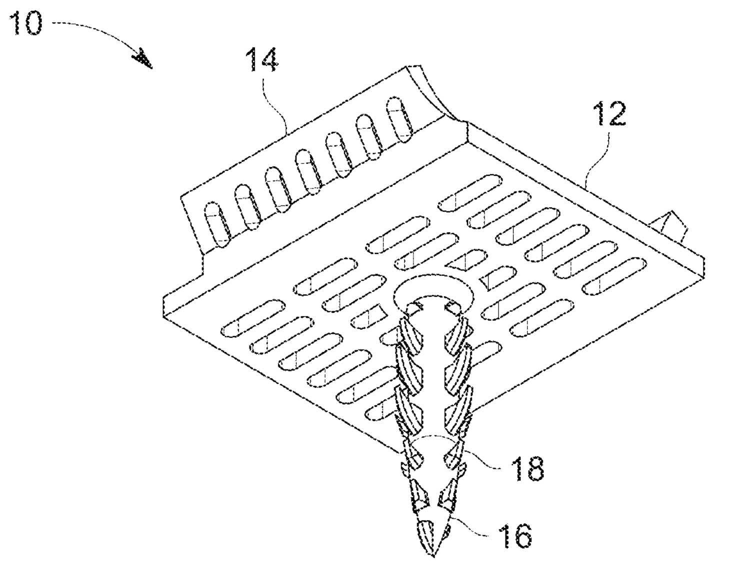
FIG. 2 is a bottom perspective view of the chip connector.
Figure 3:
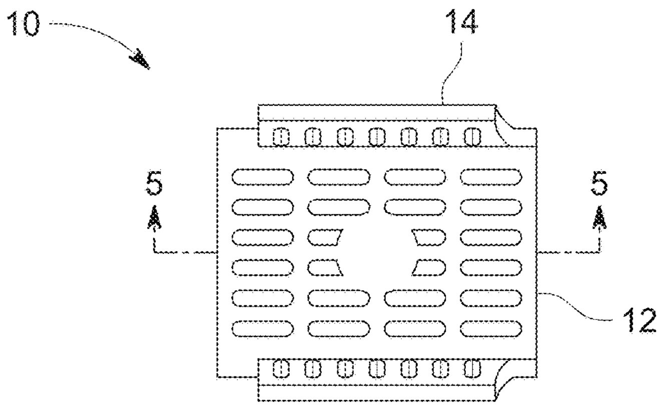
FIG. 3 is a top view of the chip connector.
Figure 4:
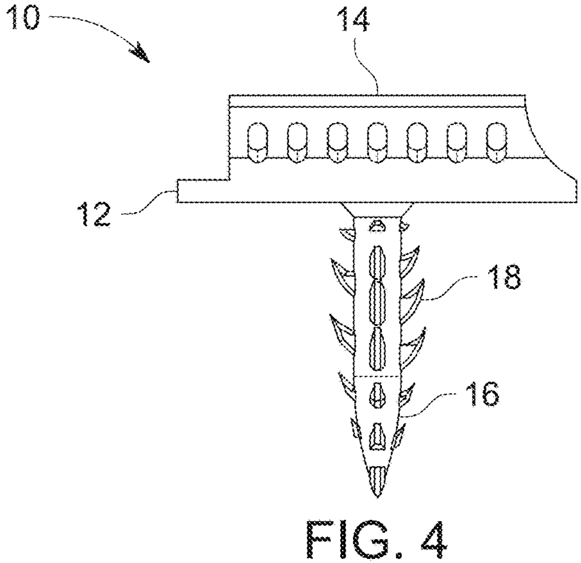
FIG. 4 is a side view of the chip connector.
Figure 5:
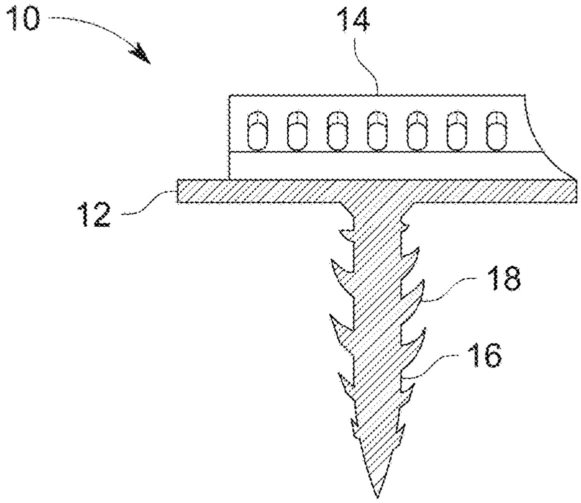
FIG. 5 is a section view, taken along line 5-5 in FIG. 3.
Figure 6:
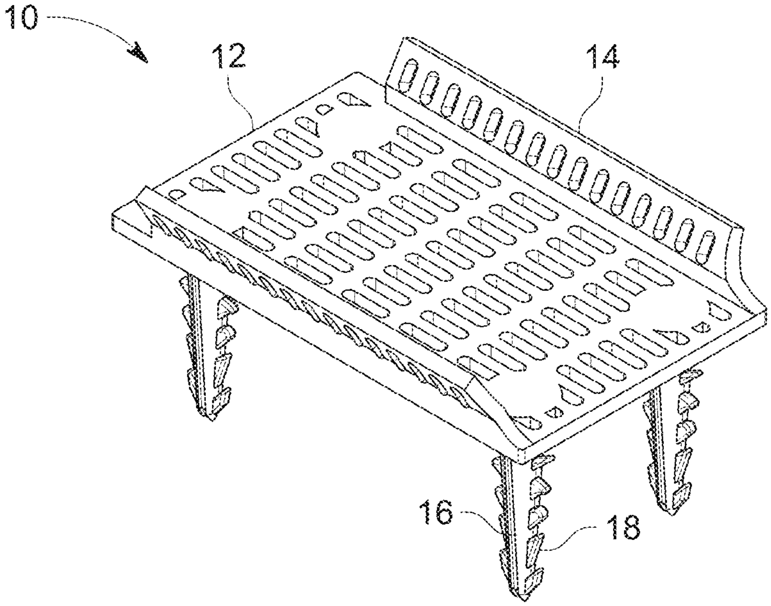
FIG. 6 is a perspective view of an alternate embodiment of the chip connector.
Figure 7:
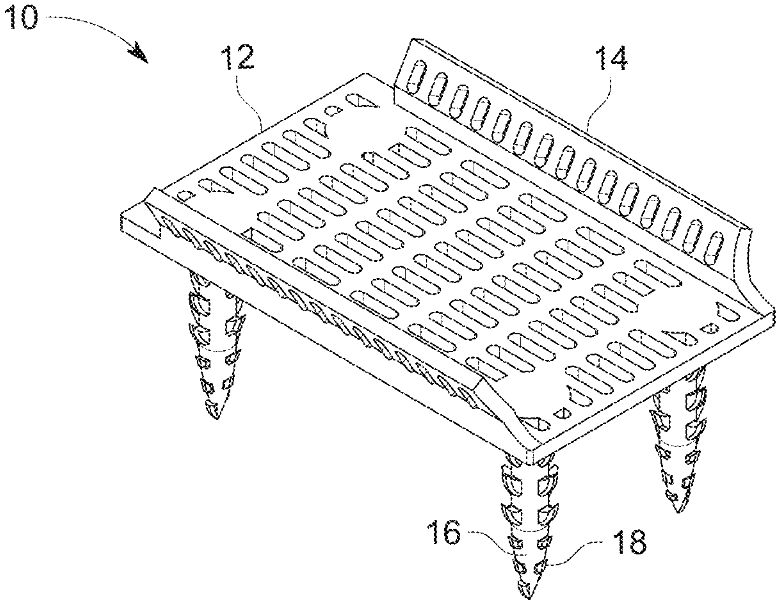
FIG. 7 is a perspective view of an alternate embodiment of the chip connector.

According to various embodiments as depicted in FIGS. 1-9, disclosed is a chip connector device 10 and system for attachment of a chip 11 to various items. In embodiments, connector device 10 includes a tray 12 configured to hold chip 11 and at least one barbed post 16 coupled to a bottom side of tray 12. The disclosed system may be used for tracking, prevention of loss, theft prevention, owner identification, product identifying, and/or for storage of other information which may be related to the item. In one embodiment, chip 11 may be a GPS tracking microchip, which enables tracking the location of a device to which chip connector is attached. It shall be appreciated that in alternate embodiments, connector device 10 may be used to attach other small objects to items.

In certain embodiments, connector device 10 is configured to attach to soft, pliable, and/or plush material. Examples of such material include, but are not limited to leather, animal skin, Kevlar, synthetic fabric, soft metal, soft plastics, padding, and the like. Preferably, the material has a thickness at least equal to or greater than the length of barbed post 16, but not necessarily so. In some embodiments, barbed post 16 may have a sharp bottom end which facilitates piecing a material. In further embodiments, barbed post 16 includes a plurality of barbs 18 which are configured to embed in the material. As such, connector device 10 may be attached to the material of an item by pushing barbed post 16 through the material of the item. As barbed post 16 pierces the material, barbs 18 get caught and enmeshed within the material to securely attach connector device 10 to the item. Furthermore, pulling connector device 10 out of the material requires substantial force and leaves a gaping tear within the material, thus deterring individuals from attempting to do so.

In some embodiments, as depicted in FIGS. 1-5, connector device 10 may include a single barbed post 16, which may be centrally disposed within tray 12. In other embodiments, connector device 10 may include multiple barbed posts 16 for increased attachment strength. In one embodiment as depicted in FIGS. 6-9, connector device 10 includes 4 posts which are disposed proximate the 4 corners of tray 12.

Figure 8:
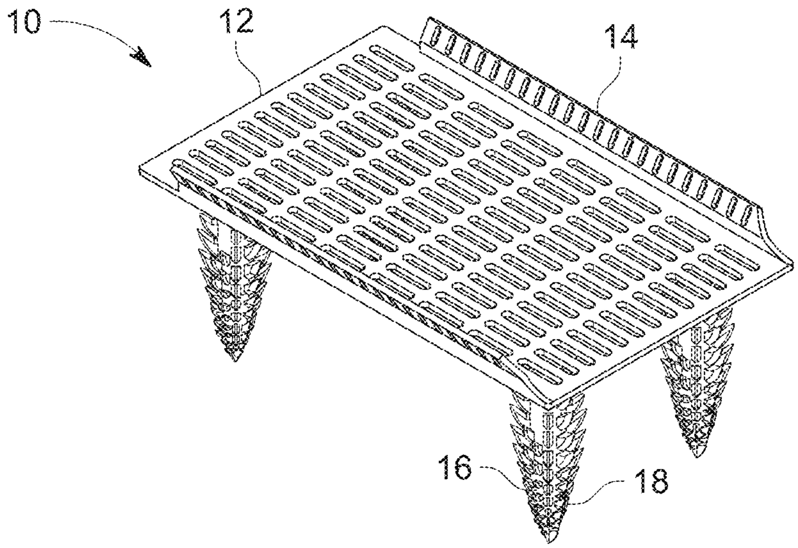
FIG. 8 is a perspective view of an alternate embodiment of the chip connector.
Figure 9:
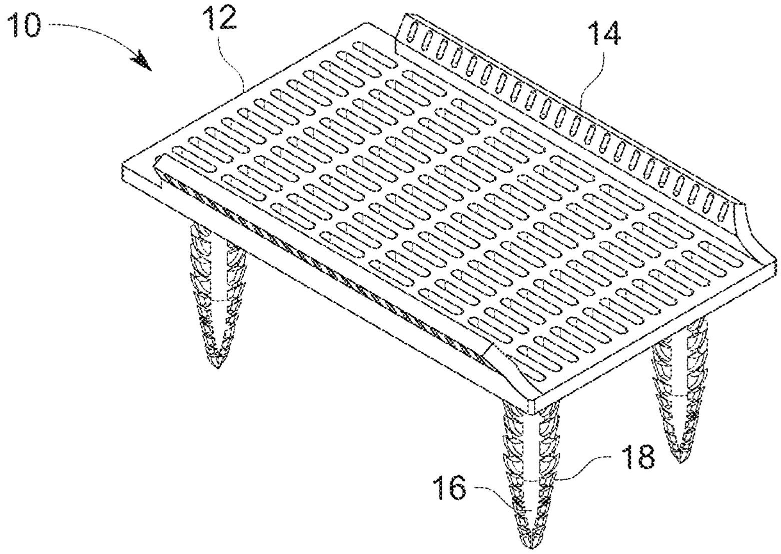
FIG. 9 is a perspective view of an alternate embodiment of the chip connector.

In some embodiments, connector device 10/barbed post 16 may be made of metal, or other hard material such as hard plastic, and the like. In certain embodiments, barbs 18 may have a cone or hook shape which generally curves and tapers upwards to a point as depicted. Furthermore, post 16 may have any number of barbs 18, wherein the attachment strength is generally increased with more barbs. In one example as depicted in FIGS. 1-7, post 16 may be approximately 10 mm in length, and includes about 25-30 barbs, which are arranged in an approximately even distribution along the length and circumference of post 16. During testing, it was found that such post was not removable from a leather baseball glove using normal hand force. In another embodiment, as depicted in FIG. 8, a post 16 which is approximately 10 mm in length may have about 50-60 barbs. It shall be appreciated however, that the number and/or shapes of barbs 18 may vary in alternate embodiments. It shall further be appreciated that in alternate embodiments, post 16 may be of different lengths and include any number of barbs sufficient to attach device 10 to the material of interest.

In certain embodiments, tray 12 provides a supportive platform for chip 11, wherein chip may be attached via various known methods, including but not limited to soldering, adhesion, and other known techniques. In one embodiment, tray 12 is provided with a plurality of perforations 12A configured to receive connector pins 11A in the chip. In further embodiments, tray 12 may include side walls 14 which enable connector device 10 be held, i.e., between a user's thumb and index finger, and may further protect the chip from impact. In some embodiments, side walls 14 may flare outwards as depicted. It shall be appreciated that that tray 12 may include other features which protect chip from impact, including front and back walls, and/or a top wall. It shall further be appreciated that tray 12 may include any number of perforations and/or other feature which facilitated in the attachment of chip 11 according to various techniques. According to an exemplary embodiment, tray 12 may be approximately 15 mm by 25 mm, with a thickness of less than about 1 mm or about 0.76 mm, wherein side walls 14 may be about 2-3 mm long and perforations 12A are about 0.64 mm wide. It shall be appreciated however, that the size and dimensions of tray 12 may vary in alternate embodiments depending on factors such as the size of the object held by the tray, item to which device 10 is attached, design preferences, material costs, etc. For example, the tray may be made larger for storage of a battery and/or antenna along with the chip and/or for storage of larger modules or other objects.

The disclosed system may be used for tracking, owner identification, prevention of loss, theft prevention, and/or for storage of information which may be related to the item. In one embodiment, chip 11 may be a GPS tracking microchip, a T-tag, or other information storage chip, which may be used for various applications, including but not limited to location tracking, owner and/or item identification, alarm activation, surveillance, amongst others. It shall be appreciated that in alternate embodiments, connector device 10 may be used to attach other small objects to items. In certain embodiments, connector device may be attached to materials including Kevlar, leather, animal skin, soft metal, soft plastics, natural fabric, synthetic fabric, wood, and/or nylons, amongst others, and may be used to connect a computer chip or any other small object to such materials.

In some embodiments, connector device 10 may be used to attach chip 11 to sport equipment such as baseball gloves, wherein chip 11 stores owner identity information. This may be particularly beneficial for equipment used in team sports, e.g., hockey gloves, baseball gloves, and the like, wherein equipment belonging to the individual team members often gets mixed up. Other items to which connector device 10 may be used to attach chip 11 for tracking and/or owner identification may include handbags, backpacks, baby strollers, car seats, infant car seats, animals, shoes, helmets, pillows, mattresses, furniture, etc. In other embodiments, connector device 10 may be used to attach chip 11 to retail items for preventing store theft. As the barbed post 16 of connector device 10 creates a strong connection which cannot be removed by normal hand force, and/or which will destroy the item if removed, it provides an effective system for prevention of loss and/or theft. In other application connector device 10 may be used for tracking children or cognitively impaired individuals by attaching a tracking chip to items worn or carried by individuals (e.g. shoes, backpacks, toys, etc.). In further embodiments, connector device 10 may be used to attach the tracking chip to leather components of vehicles (e.g., car or motorcycle seats) to prevent theft of the vehicle.

In some embodiments, connector device 10 may be installed in an item by pushing it through the material in the item. In some embodiments, plyers, clamps, or other suitable equipment may be used to force barbed post 16 through the material. Such equipment may be specifically designed to avoid contact with the chip 11 while applying force. For example, plyers may be designed to contact and apply a force to a section of tray 12 uncovered by chip 11, while leaving chip 11 untouched. In some other embodiments, tray 12 may include front and back walls, and/or a top wall configured to surround chip, and which provide contact points for plyers or other equipment, enabling device 10 to be installed while fortressing chip 11. In one embodiment, a retail or online store may install connector device 10 in a purchased item with chip 11 that contains the purchaser's identity information. For example, stores selling sporting goods may offer to install connector device 10 supporting a chip that enables tracking and/or identifying the owner of a purchased item having a surface into which device 10 may be installed (e.g., baseball gloves, hockey equipment, etc.).

As such, the disclosed subject matter provides an effective method and device for secure attachment of a chip to various items. The disclosed system may be useful in tracking various consumer products but may also find application industries such as medical animals, military, animal/wildlife research, amongst others.

It shall be appreciated that device 10 may have different configurations in alternate embodiments. In some embodiments, device 10 may be fabricated by 3-D printing or injection molding. It shall be appreciated however, that device 10 may be manufactured using any known techniques in the field. It shall be appreciated that device 10 may be made of any alternative known materials in the field and be of any size and/or dimensions.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for connecting a computer chip to an item, the system comprising:

attaching a chip connector device to the item, the chip connector device including a tray configured to retain the computer chip, and at least one barbed post coupled to an underside of the tray, the barbed post configured to pierce and enmesh within a soft, pliable, and/or plush material in the item, wherein attaching the chip connector device comprises forcing the barbed post through the material of the item.

2. The system of claim 1, wherein the tray is rectangular.

3. The system of claim 1, wherein the barbed post comprises a post having a sharp bottom end configured to pierce the material in the item.

4. The system of claim 3, wherein the barbed post further includes a plurality of barbs, are configured to embed in the material.

5. The system of claim 4, wherein the connector device includes a single barbed post at an approximate center of the tray.

6. The system of claim 4, wherein the connector device includes multiple barbed posts.

7. The system of claim 6, wherein the connector device includes 4 barbed posts which are disposed proximate corners of the tray.

8. The system of claim 4, wherein the plurality of barbs are each curved upwards from the post towards the tray to form upwardly extending hooks in the post.

9. The system of claim 4, wherein the plurality of barbs each have a pointed end.

10. The system of claim 4, wherein the barbed post is approximately 10 mm in length.

11. The system of claim 10, wherein the barbed post includes about 25-30 barbs, which are distributed along a length and a circumference of the post.

12. The system of claim 10, wherein the barbed post includes about 50-60 barbs, which are distributed along a length and a circumference of the post.

13. The system of claim 1, wherein the tray includes a plurality of perforations configured to receive connector pins in the chip.

14. The system of claim 1, wherein the tray includes opposing side walls which enable the connector device to be held.

15. The system of claim 14, wherein the side walls in the tray flare outwards.

16. The system of claim 1, wherein the tray has a rectangular shape and is approximately 15 mm by 25 mm, with a thickness of less than about 1 mm.

17. The system of claim 1, wherein the computer chip is a GPS tracking chip.

18. The system of claim 1, wherein the chip stores information regarding an identity of an owner of the item.

19. The system of claim 1, wherein the chip stores information regarding the item.

20. The system of claim 1, wherein the soft, pliable, and/or plush material comprises leather, animal skin, Kevlar, natural fabric, synthetic fabric, soft metal, soft plastic, wood, and/or padding.

* * * * *